(Model.)
G. WOLFE.
EARTHENWARE PAN.
No. 246,852.    Patented Sept. 6, 1881.
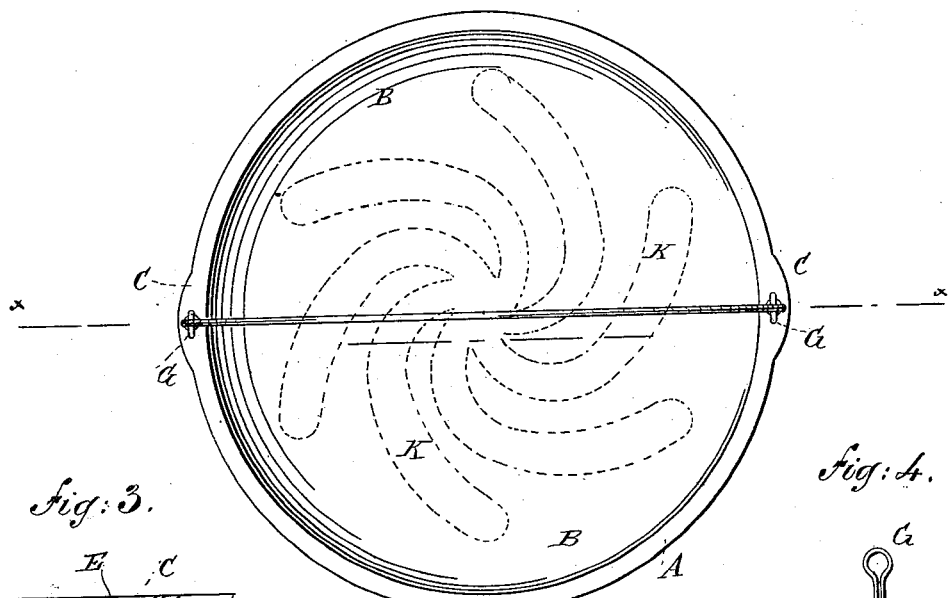
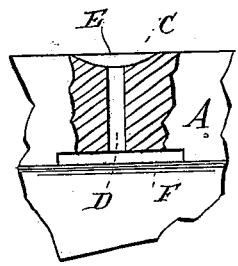
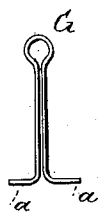
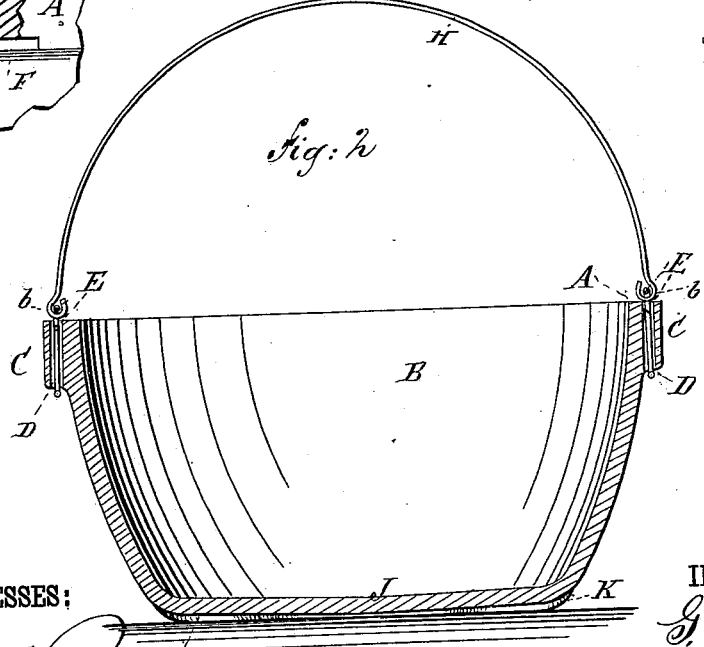
WITNESSES:
Chas. Nida.
C. Sedgwick
INVENTOR:
G. Wolfe
BY Munn & Co.
ATTORNEYS.

UNITED STATES PATENT OFFICE.

GEORGE WOLFE, OF PEORIA, ILLINOIS.

EARTHENWARE PAN.

SPECIFICATION forming part of Letters Patent No. 246,852, dated September 6, 1881.

Application filed July 28, 1880. (Model.)

*To all whom it may concern:*

Be it known that I, GEORGE WOLFE, of Peoria, in the county of Peoria and State of Illinois, have invented new and useful Improvements in Earthenware Pans, of which the following is a specification.

My invention relates to new and useful improvements in earthenware pans, such as sauce and stew pans, which have their bails attached in a durable and effective manner, and are so constructed that they are not damaged or broken by the action of the excessive heat.

The invention consists, first, in the peculiar means for connecting a bail to such earthenware pan; and, secondly, in constructing the bottom of the pan with a series of spirally-radiating ridges which are of greater depth as they approach the outer edge of the pan, so that the outer surfaces of these ridges rest in a plane, while the bottom of the pan is slightly curved, giving a slightly-rising course to the air-currents as they circulate outwardly from the center.

In the accompanying drawings, Figure 1 is a plan view of my improved earthenware pan. Fig. 2 is a cross-sectional elevation of the same on the line $x$ $x$, Fig. 1. Fig. 3 is a longitudinal sectional elevation through the swelled or expanded part of the rim, showing the formation of the aperture therein. Fig. 4 is a detail view of the eye for attaching the bail.

Similar letters of reference indicate corresponding parts.

The rim of the earthenware pan or dish B is provided with two swellings or expanded parts, C, which extend slightly outward in the horizontal plane, and are each provided with a vertical aperture, D, which terminates in a recess, E, preferably beveled, at the upper end, and in a recess, F, which may be beveled or angular, at the lower end.

A wire bent so as to form an eye, G, is passed through the said aperture, and the ends $a$ $a$ of the wire are bent at right angles to hold the eye in the aperture. The bail H is attached to the two eyes G. If the pan is not being supported by the bail, the eye G and the hooked or ringed ends $b$ $b$ of the bail pass into the recess E, and the bail rests on the rim, thus permitting any desired numbers of pans to be placed upon each other without tilting or tumbling, as the bail and eyes occupy very little space.

In bending the eye G a short piece of wire is taken and bent in the middle to form the loop or eye proper, and the two ends are then extended side by side and parallel with each other a distance equal to the vertical thickness of the swelled rim, and the ends $a$ then bent out at right angles in opposite directions.

The ends $a$ $a$ of the wire forming the eye fit into the recess F and do not project beyond the under edge of the rim A. The under side of the bottom J of the pan is provided with a series of spiral or curved radial ridges, K, which increase in height toward the periphery of the bottom. The spiral ridges are arranged on the bottom of the pan to produce a thorough circulation of the air under the vessel to prevent a cracking of the bottom. The spiral ridges form longer channels for the air than straight ridges would, and consequently answer their purpose much better. As the bottom of the vessel is slightly rounding, the increased elevations of the ridges at the edges make it set more firmly, and the channels formed between have a slight rise as they proceed outwardly from the center.

In defining the latter feature of my invention more clearly, I would state that I am aware that tin baking-pans have been crimped or corrugated spirally on their bottoms to mold or give contour to the cake within, and I do not claim this. The spiral ridges in my case are entirely external and have special value in an earthenware pan, in that they serve to distribute the heat and render its application uniform, thus preventing the cracking of the vessel, and giving, besides, a better support when off the stove.

Having thus described my invention, what I claim as new, and desire to secure by Letters Patent, is—

1. An earthenware vessel having enlarged portions C C, each provided with a vertical hole, D, through the same, in combination with the eyes G, constructed substantially as described, and fixed in the vertical holes in the parts C, and a bail loosely connected to the eyes above the parts C, substantially as shown and described.

2. An earthenware vessel having its bottom smooth on its inner side and provided on its outer and lower side with spirally-radiating ridges increasing in depth toward the outer edges, as described.

3. An earthenware vessel provided with two side lugs located diametrically opposite each other, and having longitudinal perforations D D and horizontal recesses F, substantially as described.

GEORGE WOLFE.

Witnesses:
AUSTIN F. JOHNSON,
WARREN KINSEY.